(12) United States Patent
Crescenzo

(10) Patent No.: US 10,694,772 B2
(45) Date of Patent: Jun. 30, 2020

(54) METHOD OF PITTING AND CUTTING FRUITS AND MULTI-LANE MACHINE THEREFOR

(71) Applicant: Biagio Crescenzo, Montecorvino Pugliano (IT)

(72) Inventor: Biagio Crescenzo, Montecorvino Pugliano (IT)

( * ) Notice: Subject to any disclaimer, the term of this patent is extended or adjusted under 35 U.S.C. 154(b) by 0 days.

(21) Appl. No.: 16/078,175

(22) PCT Filed: Feb. 22, 2017

(86) PCT No.: PCT/IB2017/051016
§ 371 (c)(1),
(2) Date: Aug. 21, 2018

(87) PCT Pub. No.: WO2017/145074
PCT Pub. Date: Aug. 31, 2017

(65) Prior Publication Data
US 2019/0069592 A1    Mar. 7, 2019

(30) Foreign Application Priority Data

Feb. 26, 2016  (IT) .......................... UB2016A001104

(51) Int. Cl.
*A23N 4/04* (2006.01)
*A23N 4/22* (2006.01)

(52) U.S. Cl.
CPC ........ *A23N 4/04* (2013.01); *A23N 4/22* (2013.01)

(58) Field of Classification Search
CPC .................................. A23N 4/04; A23N 4/22
See application file for complete search history.

(56) References Cited

U.S. PATENT DOCUMENTS

| | | | |
|---|---|---|---|
| 1,698,427 A * | 1/1929 | Brauer | H01H 35/18 74/110 |
| 1,785,001 A | 12/1930 | Duncan | |
| 2,403,516 A | 7/1946 | Gaddini | |
| 2,924,259 A | 2/1960 | Magnuson | |
| 3,835,765 A | 9/1974 | Tomelleri | |
| 3,878,309 A | 4/1975 | Anderson et al. | |
| 4,150,611 A | 4/1979 | Bellini | |
| 2014/0131174 A1 * | 5/2014 | Crescenzo | B65G 47/248 198/712 |

* cited by examiner

*Primary Examiner* — Anthony J Weier
(74) *Attorney, Agent, or Firm* — Browdy and Neimark, PLLC

(57) ABSTRACT

A fruit pitting and cutting method provides a fruit feeding along more fruit lanes, a pre-cutting stage to create an incision in the upper portion and the lower portion of each fruit, a pitting stage, in which the pit is separated from the flesh but remains inside the fruit, and a subsequent cutting stage in which a vertical cut is made in side parts of each fruit to be divided into two halves. A multi-lane machine is also described that has a longitudinal frame, a fruit flight conveyor, movable upper and lower transverse heads, a station including a pre-cutting section, a pitting section, and a cutting section separated in succession.

6 Claims, 12 Drawing Sheets

METHOD OF PITTING AND CUTTING FRUITS AND MULTI-LANE MACHINE THEREFOR

TECHNICAL FIELD

The present invention relates to a method of pitting and cutting fruits. Furthermore, it relates to a multi-lane machine for pitting and cutting fruits. The treated fruits are especially peaches.

BACKGROUND ART

In the current machines, both in the machines working by torsion and in the multi-lane machines with knives, a cutting operation, that is the division in two halves of the fruits, and a pitting operation are performed in the same time for each fruit and with the same tool.

Nevertheless, it can happen, especially for the peaches, that the pit of the fruit is not intact, and is split in two halves when the fruit is cut.

In the current methods and machines, when a pitting operation starts, the fruit is already divided in two halves and, if the pit happens to be broken, the pitting operation is not performed around a defined geometric shape, but around a piece that splits up. In this case, the rotation of the knife crosses the pit or does not enclose it completely, being the pit already separated while being cut.

The consequence of this drawback is the presence of pit fragments, that are difficult both to locate and remove in the following operations.

U.S. Pat. No. 3,835,765 A in the name of G. Tomelleri had tried to remedy this drawback. This patent describes an apparatus for pitting and cutting fruits neatly oriented along one line with their axis in a vertical position and their stalk facing upward. In this apparatus a pitting section for separating the pit from the fruit flesh, the pit remaining inside the fruit, precedes a cutting section in which a vertical cut is made in side parts of each fruit in order to divide it in two halves. Tomelleri does not provide a pre-cutting section in which a pre-cutting blade incises superiorly the fruit in order to facilitate the insertion of crescent-shaped pitting blades.

Tomelleri uses vertical retaining blades that flank the pitting blades in order to hold steady the fruit being enclosed between a cup element for supporting the fruit and a fruit pressing cap that presses the fruit from above. In the pitting section, the vertical blades do not plunge into the fruit flesh for all its height, but help the fruit resist the torsion provoked by the pitting blades. In fact, the fruit pressing cap is not able to hold the fruit steady. Nevertheless, the fruit retaining vertical blades cut the fruit flesh so that fibers of the fruit have no more a containing and cooperating function that prevents the splitting of the pit in a vertical direction, when the pit is fractured.

U.S. Pat. No. 3,878,309 A in the name of G. R. Anderson describes a multi-lane machine for pitting fruits to which the teachings of Tomelleri could be applied in order to obtain a method and a multi-lane machine for pitting and then cutting fruits.

SUMMARY OF THE INVENTION

The present invention aims to solve the problem of pitting and then cutting the fruit in two halves without provoking an unacceptable deformation of the fruit.

In particular, an object of the invention is to provide a method and a machine in which the pitting and cutting operation is performed not in one stage, but in two subsequent stages, achieving a precise pit removing cut that, with fractured pits being inside the fruit, does not scatter in the fruit flesh pit parts that are dangerous if ingested, especially by babies.

Another object of the invention is to allow a precise insertion of pitting knives by a previous incision of upper and lower parts of the fruit.

Yet another object of the invention is to permit the cooperation of the fruit fibers not cut before the pitting stage, and the consequent keeping together of the flimsy pit.

Further another object of the present invention is to assure a reliable temporarily block of the fruit during the pitting operation.

Therefore, in a first aspect thereof the present invention provides a method of pitting and cutting fruits, comprising a multi-lane feeding of fruits that are neatly oriented with their axis in a vertical position and their stalk cavities facing upward, a pitting stage, in which the pit is separated from the fruit flesh but remains inside the fruit while the fruit is held steady being temporarily blocked, and a cutting stage in which a vertical cut is made in side parts of each fruit to be divided in two halves, a pre-cutting stage being provided before the pitting stage, to create an incision in an upper and a lower portion of each fruit.

Thanks to the pitting that precedes the fruit cutting in two halves, the pit, even if flimsy, is not strained vertically by actions aimed to open the fruit. Then, there is no risk that pit fragments remain attached to one half or both halves of a fruit.

Therefore, if pitting is performed alone and cutting is performed subsequently, a complication occurs: the fruit that tends to move together with the pitting knives, when they rotate, must be kept steady.

Advantageously, according to the invention, the temporary clamping of the neatly oriented fruit when being pitted is carried out on the surface of the fruit without using retaining blades that penetrate the fruit flesh.

Thereby, the fruit flesh does not risk to be damaged or deformed due to the blades or other invasive retaining means.

In a second aspect thereof, the invention provides a multi-lane machine in the claims.

The machine according to the invention provides a pre-cutting section for promoting an efficacious insertion of the pitting blades; further, by way of an example, fruit temporarily clamping devices are described that base on the use of a member elastically deformable by compressed air.

BRIEF DESCRIPTION OF DRAWINGS

Further features and advantages of the present invention will become more apparent from the indicative, and therefore non-limiting, description of an embodiment of a multi-lane machine for cutting and pitting fruits, as illustrated in the accompanying drawings in which.

DESCRIPTION OF PREFERRED EMBODIMENTS OF THE INVENTION

Figure 1:
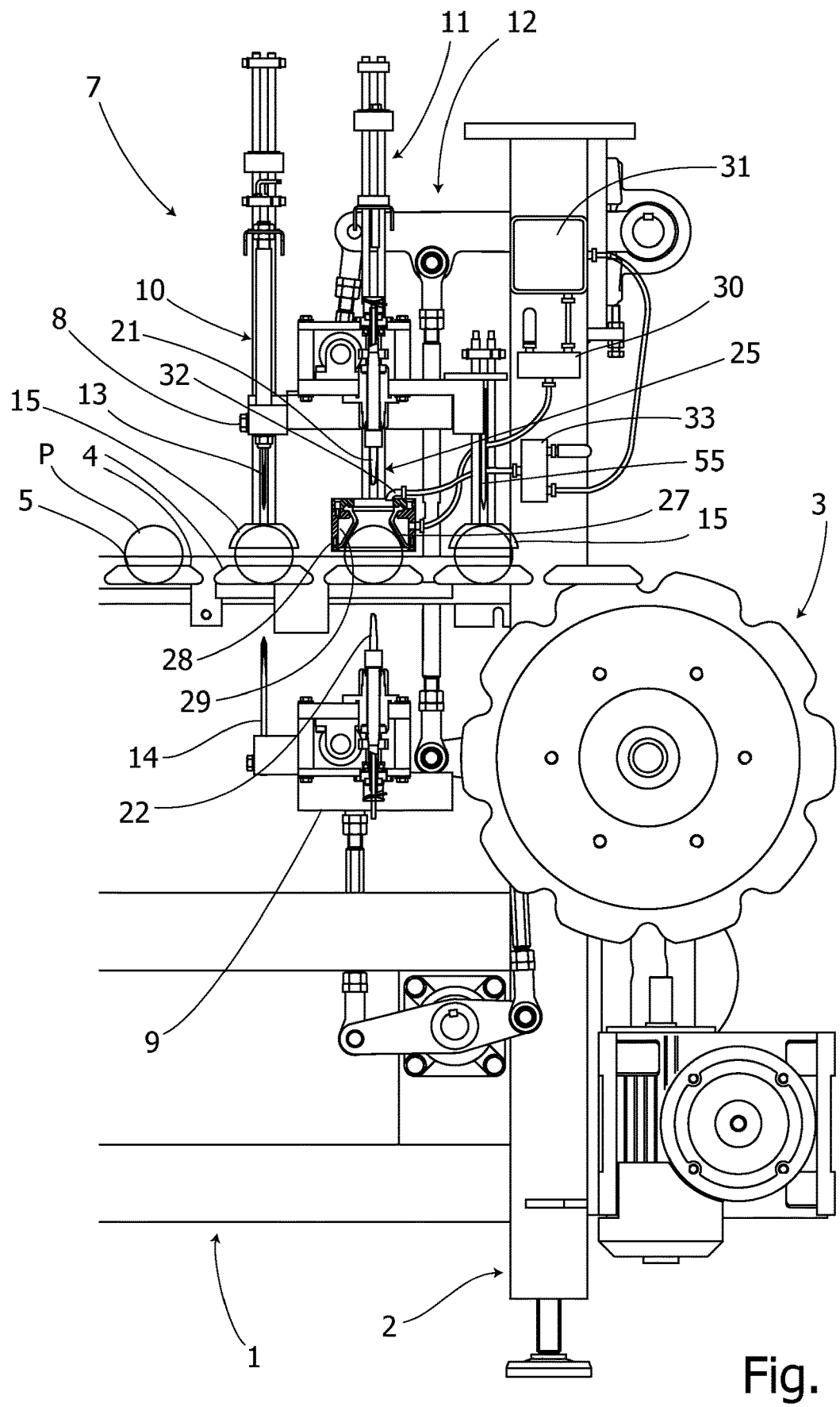
FIG. 1 is a partially cut fragmentary schematic side view of a multi-lane machine shown in the fruit pre-cutting, pitting and cutting station according to the present invention.

Reference is initially made to FIG. 1 that is a partially cut fragmentary schematic side view of a multi-lane machine shown in the fruit pre-cutting, pitting and cutting station according to the present invention. The multi-lane machine in which the method according to the present invention is embodied, comprises a longitudinal frame 1 terminating with a portal 2 and a fruit flight conveyor 3 advancing along the longitudinal frame 1. Fruit holding flights 4 are shaped with a series of recesses 5 dimensioned according to the fruit P to be carried and spaced apart transversely; each recess 5 is inferiorly provided with an opening 6.

Mounted on the portal 2 is a fruit pre-cutting, pitting and cutting station generally indicated as 7, comprising an upper transverse head 8 and a lower transverse head 9 both being vertically movable with respect to the fruit holding flights 4 towards and away with respect to the recesses 5. The movement of the transverse heads 8, 9 is carried out with beams and rocker arms shown in FIG. 1 and not further described in detail because known, by means of an actuator not shown.

Figure 2:
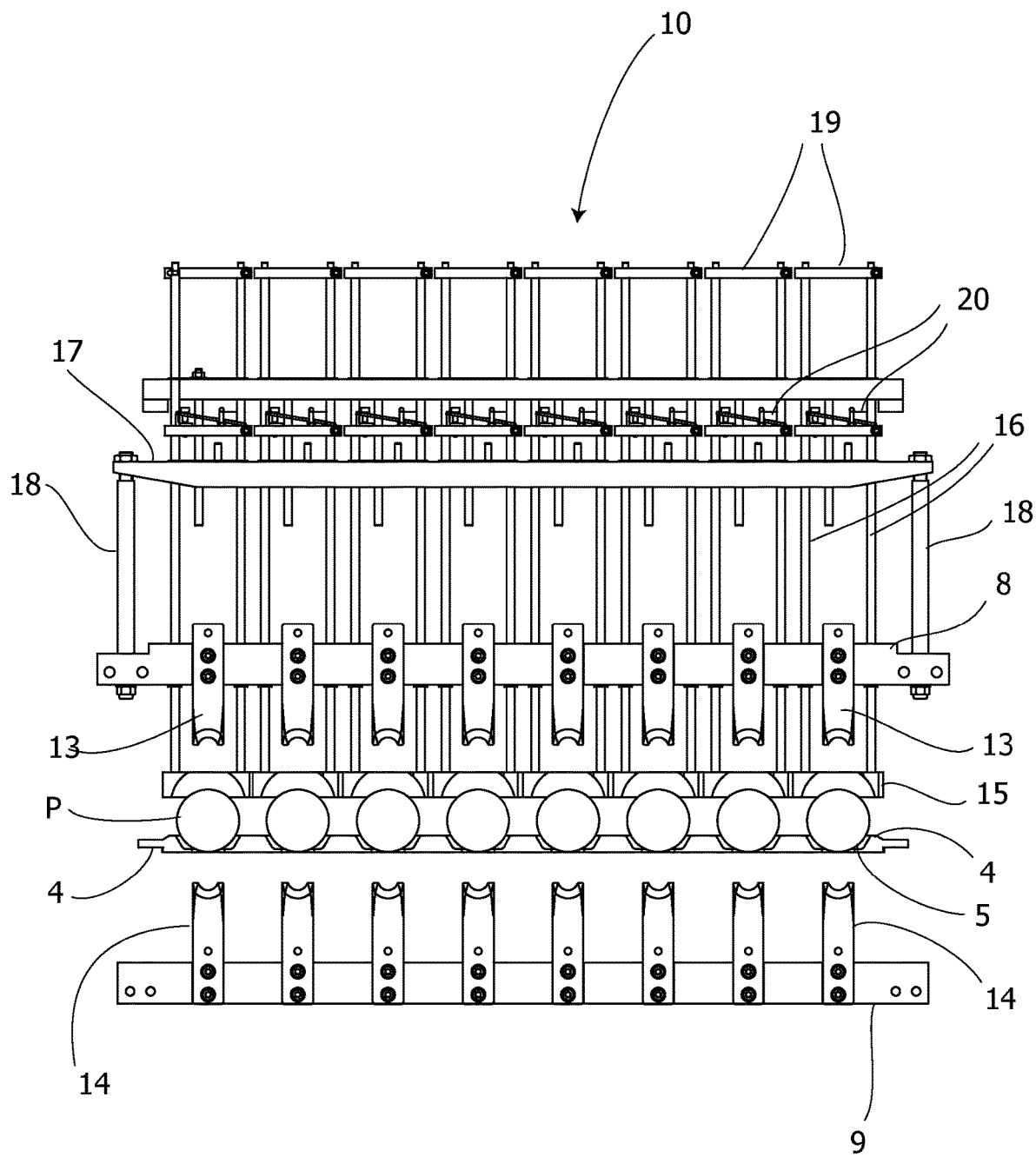
FIG. 2 is a fragmentary front view of a pre-cut section fruit pre-cutting, pitting and cutting station in FIG. 1.

The upper and lower transverse heads 8, 9 constitute a base for blades and knives both being described in detail with reference to FIGS. 2, 3 and 4 that are, respectively, partial front views of a of pre-cutting section 10, a pitting section 11 and a cutting section 12 of the pre-cutting, pitting, and cutting station 7 in FIG. 1.

The pre-cutting section 10 has a plurality of upper blades 13 and lower blades 14 fixed mutually facing to the upper transverse head 8 and the lower transverse heads 9 respectively. The pre-cutting section 10 also has a plurality of hollow retaining elements 15 for holding the fruits P in position. Each retaining element 15, being in the form of a spherical segment with open bases, is hung to a pair of vertical shafts generically indicated as 16, which are movable through the upper transverse head 8 and is intended to lean by gravity on a respective fruit P neatly oriented in the recess 5 of the fruit holding flight 4. In a known way, a horizontal beam 17 is secured to the transverse upper head 8 by means of rods 18. The horizontal beam 17 is provided with through holes (not shown) for the vertical shafts 16, which are joined in pairs at the top with small bars 19 and are also equipped with braking devices generically indicated as 20 that are not described since they are known. Such braking devices regulate the stroke speed in descent of the hollow retaining elements 15. The hollow retaining elements 15 serve to keep the fruits P in their neatly oriented position, while the blades 13, 14, which are respectively fixed to the upper and lower transverse heads 8, 9 carry out the pre-cutting of the fruits P.

According to the present invention, the pre-cutting, pitting and cutting station also includes the pitting section 11 and the cutting section 12.

Figure 3:
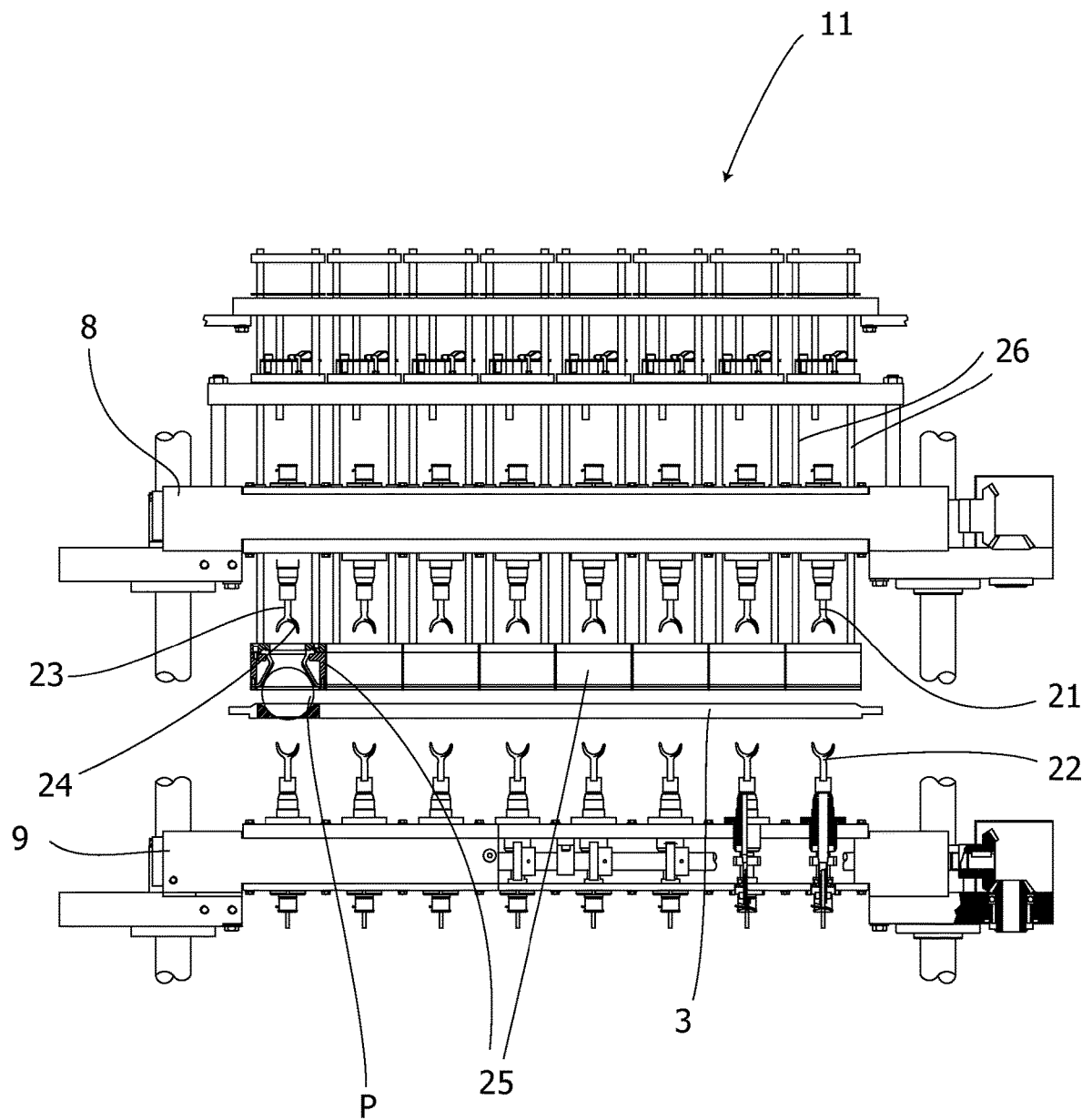
FIG. 3 is a partially cut fragmentary front view of a pitting section in the fruit pre-cutting, pitting and cutting station in FIG. 1.
Figure 4:
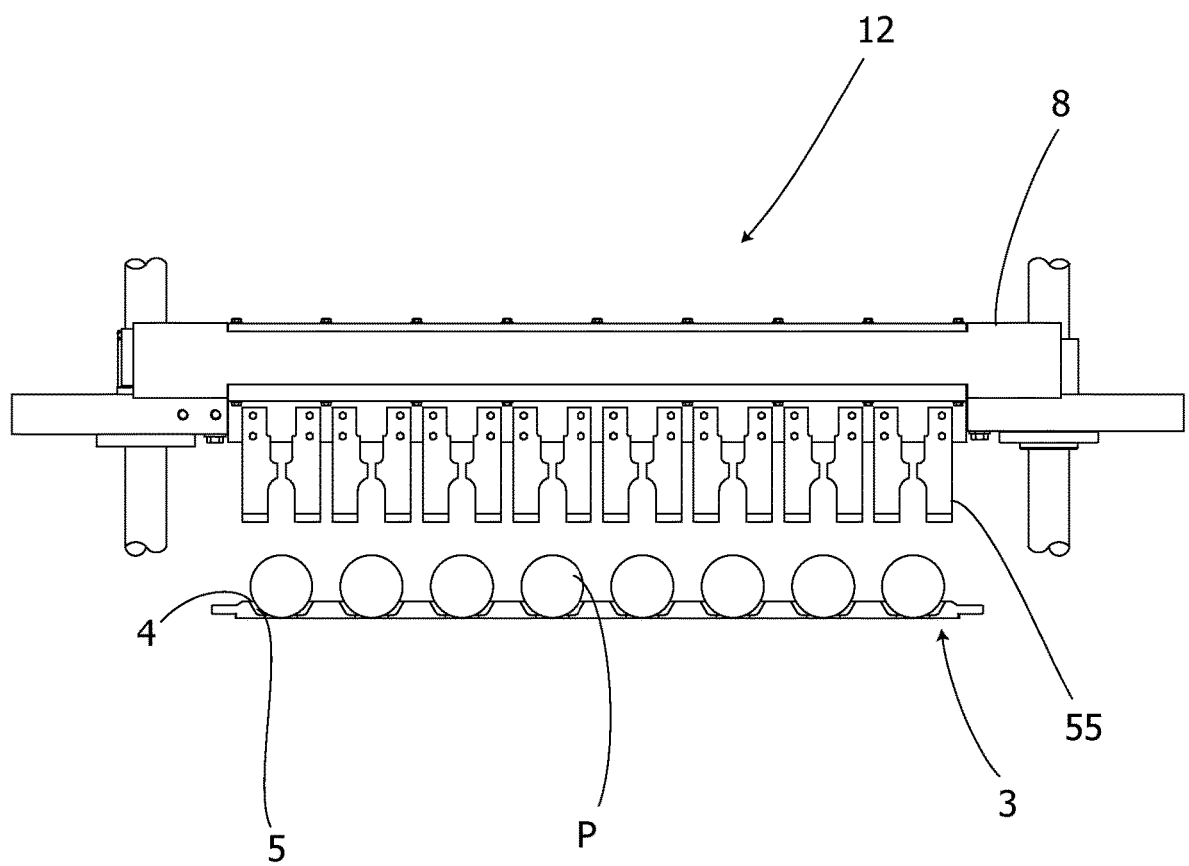
FIG. 4 is a fragmentary front view of a cutting section in the fruit pre-cutting, pitting and cutting station in FIG. 1.

With reference to FIGS. 1 and 3, the pitting section 11 has a plurality of upper and lower rotary knives 21, 22 mounted on the upper and lower transverse heads 8, 9. The upper and lower rotary knives 21, 22, which are rotated around their vertical axis by means of drives which are not described since known, have a small rod 23 and a crescent-shaped end element 24 that are inserted in a fruit on opposite sides in correspondence of the pre-cut incision and rotated inside each fruit to make a cut around the pit and separate it from the rest of the fruit fresh. The rotating knives are known in the art but in the past were associated to the vertical blades for cutting the fruit into two halves.

Further, the pitting section according to the invention has a plurality of temporarily clamping devices 25 for holding steady in position each fruit neatly oriented in the recess of its fruit holding flight while it is being subjected to pitting. Each temporarily clamping device 25 is hung from a pair of movable vertical rods 26 through the upper transverse head 8 and intended to lean by gravity on respective fruits P neatly oriented in the recesses 5 of the fruit holding flight 4.

According to a first embodiment, each temporarily clamping device 25, which will be described in detail hereinafter, includes an elastically deformable convergent-divergent ribbed member 27 having open bases and airtight mounted inside a cylindrical body 28. Thus, formed between the convergent-divergent ribbed member 27 and the cylindrical body 28 is an interspace 29. The interspace 29, in the first embodiment of the clamping device 25, shown in FIG. 1, is connected by a solenoid valve 30 to a compressed air reservoir 31.

In operation, while the upper and lower knives 21, 22 pit the fruit P, the fruit P is hold steady by the convergent-divergent ribbed member 27 of the temporarily clamping device 25 by the compressed air flowing from the reservoir 31 through the solenoid valve 30. The clamping of the fruit is necessary, as above said, to prevent the twisting action exerted by the upper and lower rotary knives 21, 22 causes a displacement of the fruit P from its neatly oriented position, which displacement would cause an incorrect cutting in the subsequent cutting section 12.

From the opposite side, the temporarily clamping device 25 may cause a permanent engagement between the convergent-divergent ribbed member 27 and the fruit P. In order to avoid this case, provided in the same temporarily clamping device 25 is a removal circuit for removing the fruit P from the convergent-divergent ribbed member 27 by means of an ejection orifice 32 that is connected to a solenoid valve 33 and to the same compressed-air tank 31. The ejection orifice 32 is suitably placed above the cylindrical body 28 to help the gravity in removing the fruit P from the convergent-divergent ribbed member 27.

Figure 5:
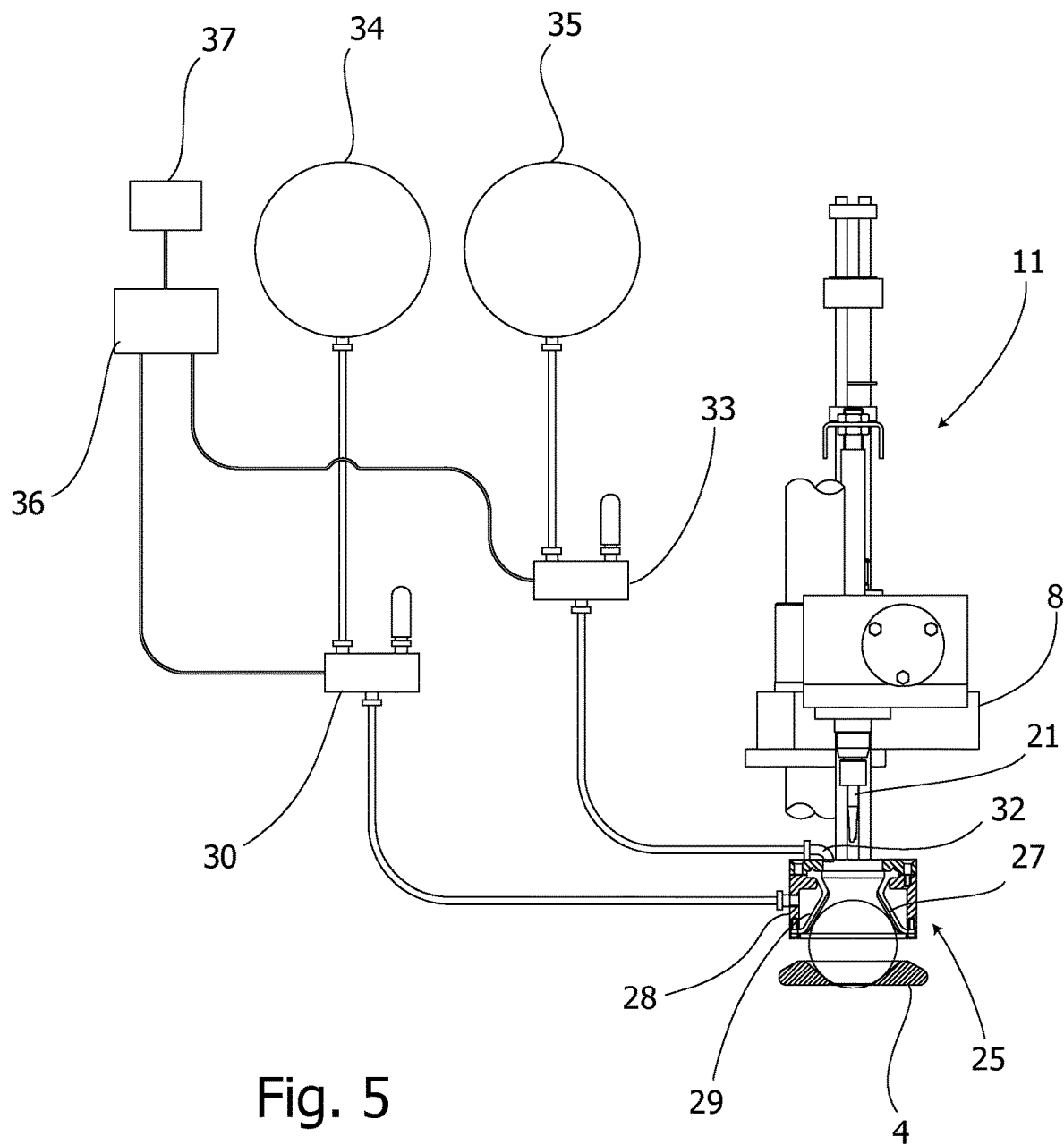
FIG. 5 is an enlarged partially cross-sectioned side view of an upper part in the pitting section.

Reference is made now to FIG. 5 that is an enlarged partially cross-sectioned side view of an upper part of the pitting section 11 with a temporarily clamping device 25 of a fruit in the recess of a fruit holding flight. Unlike the embodiment shown in FIG. 1, instead of a single compressed air reservoir 31, two compressed air reservoirs 34 and 35 are provided, the one being connected through the solenoid valve 30 to the interspace 29, the other connected via the solenoid valve 33 to the orifice of expulsion 32. In FIG. 5 there is also shown that the solenoid valves 30 and 33 are controlled by a programmable logic controller (PLC) 36, which uses an encoder 37.

Figure 6:
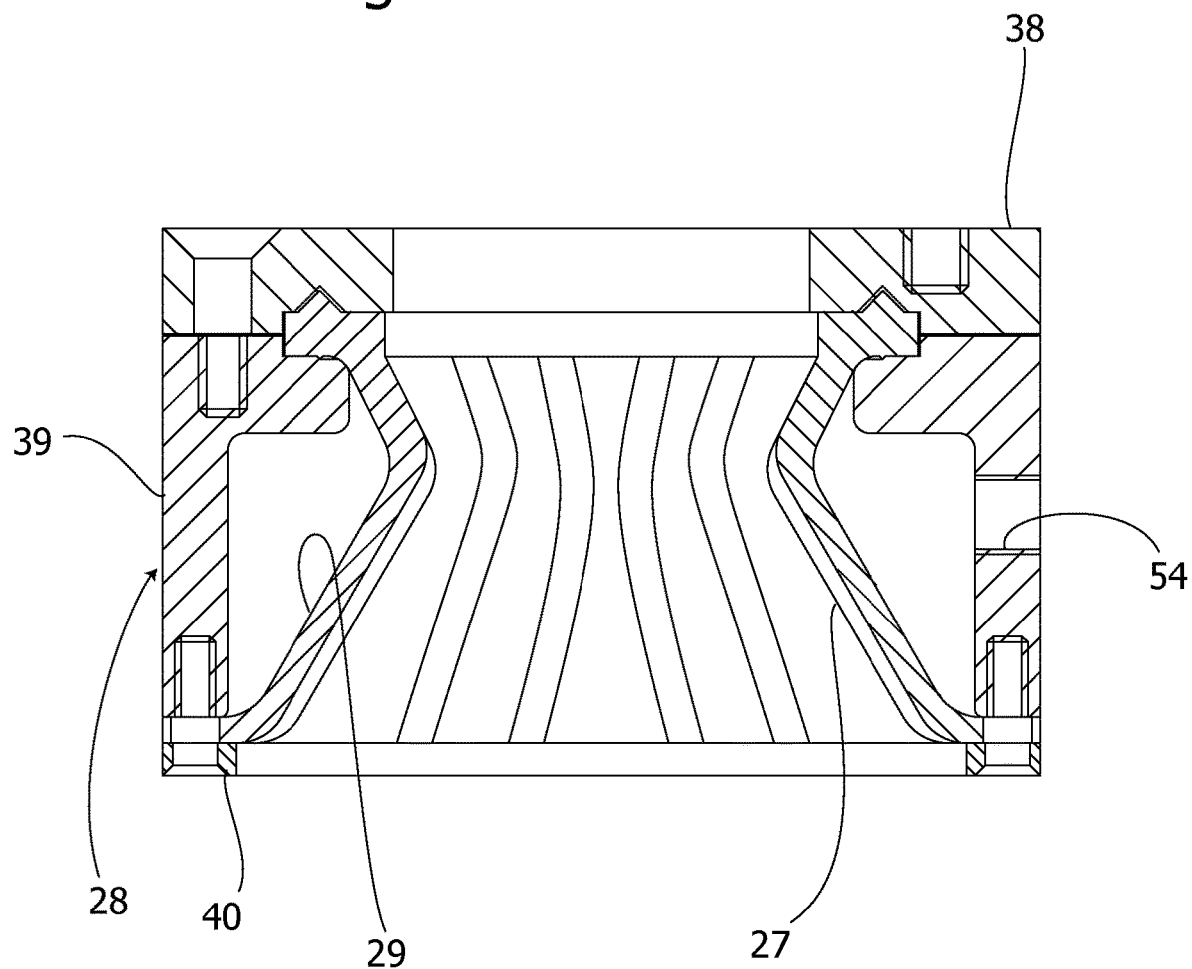
FIG. 6 is an enlarged detail of a first example of a temporarily clamping device in FIG. 5.

The temporarily clamping device 25 is depicted in FIG. 6, which is an enlarged detail in FIG. 5, and in its individual parts in FIGS. 7 to 15. As previously mentioned and shown in FIG. 6, the temporarily clamping device 25 has the convergent-divergent ribbed member 27 and the cylindrical body 28; the latter, in turn, comprises an upper element 38, a side element 39 and a lower element 40.

It should be easily understood that the convergent-divergent ribbed member 27 is sandwiched superiorly between the upper member 38 and the side element 39, and inferiorly between the side element 39 and the lower element 40.

Figure 8:
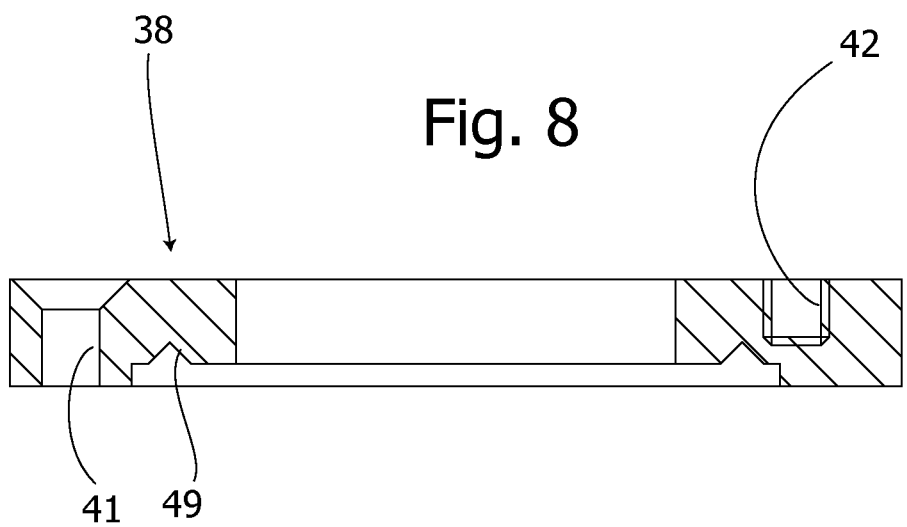
FIGS. 7 and 8 are a top plan view and a cross-section along the lines A-A, respectively, of an upper element of the temporarily clamping device in FIG. 6.
Figure 7:
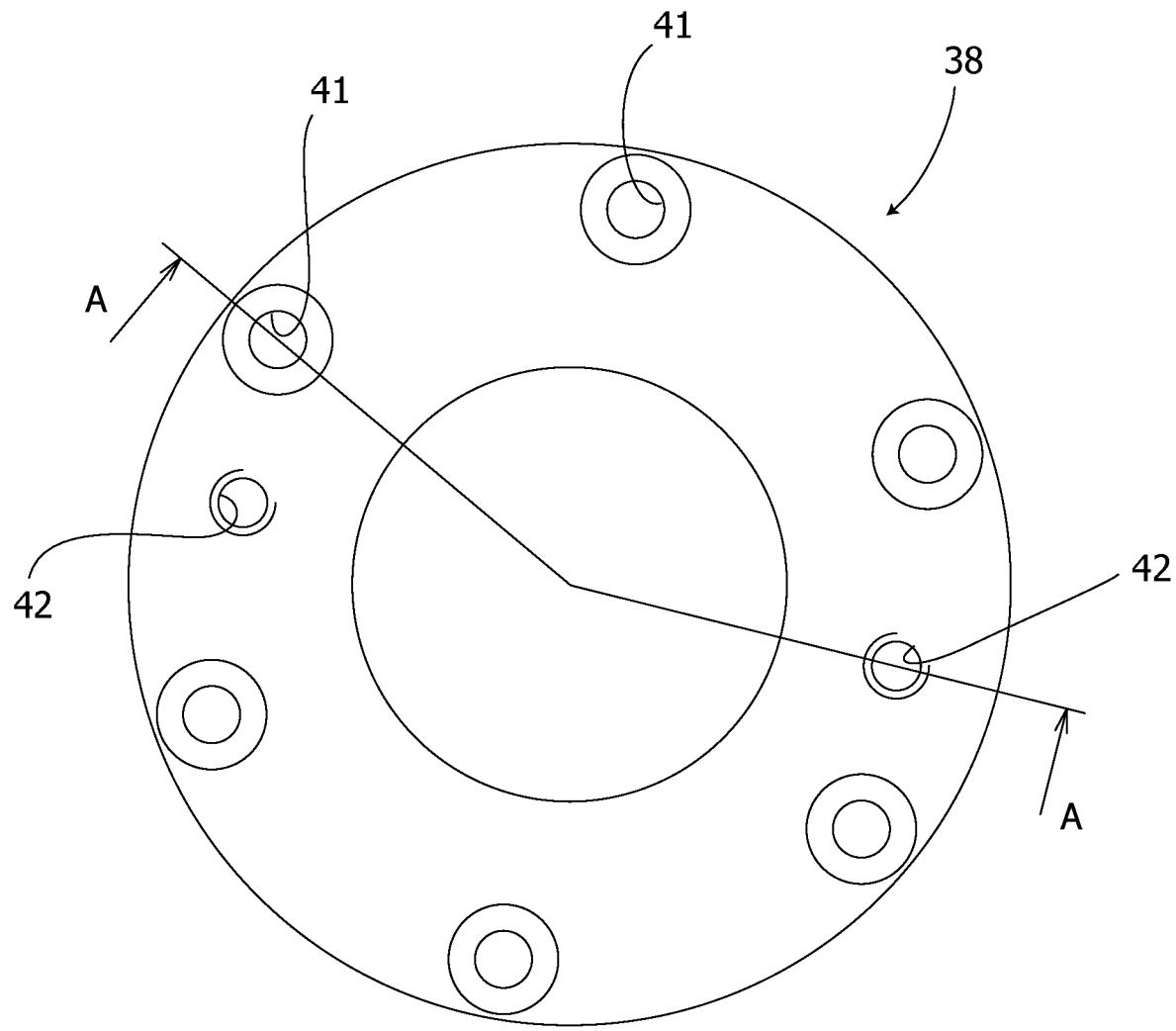

Enlarged shown in FIGS. 7 and 8 in a top plan view and in a cross-section along lines A-A the upper element 38 of the temporarily clamping device 25. The upper element 38 is substantially a ring that has a plurality of through holes 41 for a connection to the side element 39, and two blind holes 42 for screwing the vertical rods 26 shown in FIG. 3.

Figure 11:
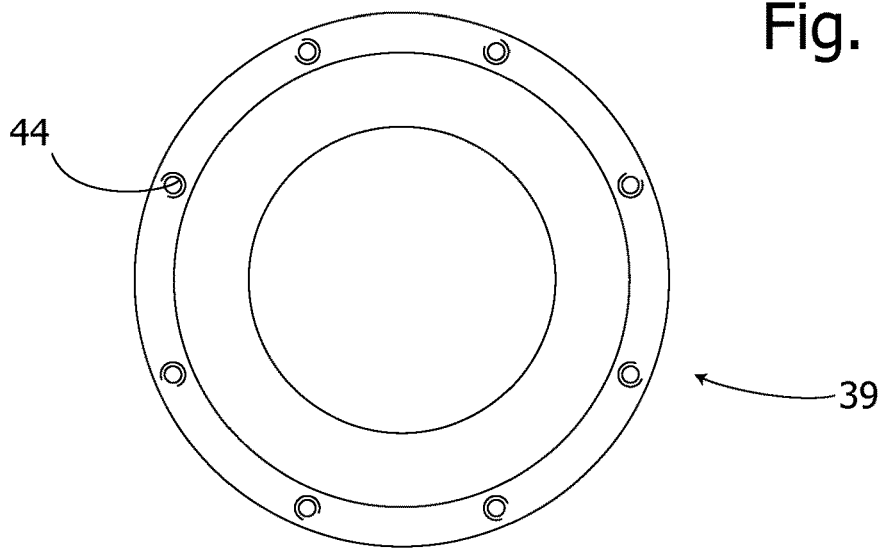
FIGS. 9, 10, and 11 are a bottom plan view and a cross-section along the lines B-B, respectively, of a side element in the temporarily clamping device in FIG. 5.
Figure 10:
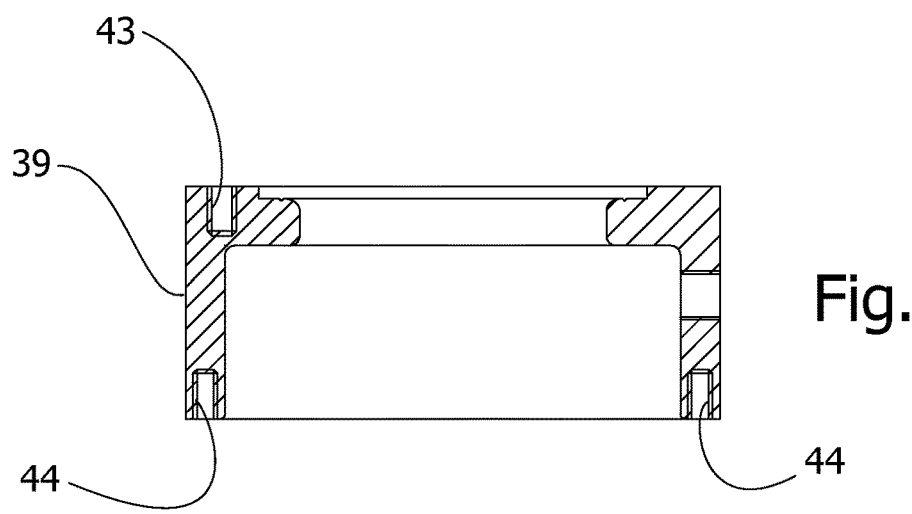
Figure 9:
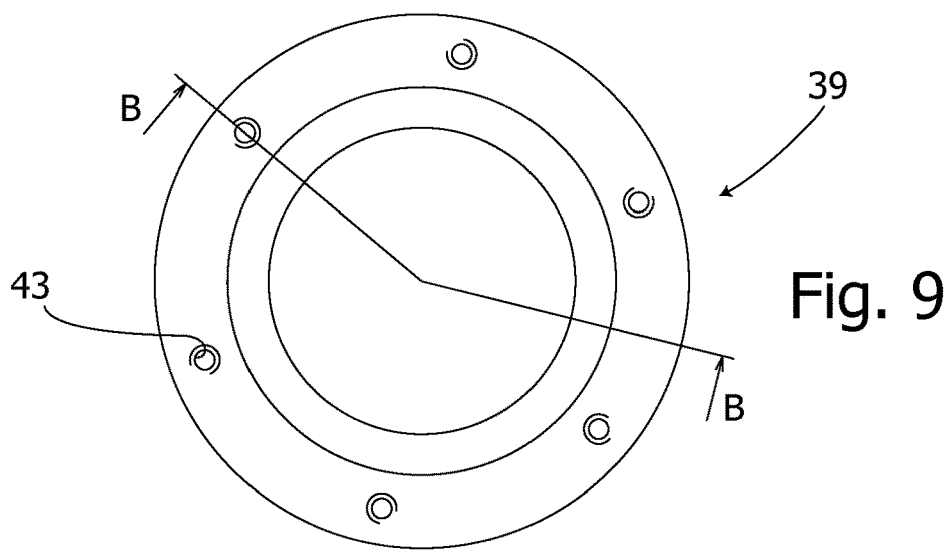

FIGS. 9 to 11 are respectively a bottom plan view and a cross-section along lines B-B of the side element 39 of the temporarily clamping device in FIG. 5. The side element 39 is substantially shaped as a sleeve which has upper threaded blind holes 43 coaxial with the through holes 41 of the upper element 38 for clamping the upper end of the convergent-divergent ribbed member 27, and lower threaded blind holes 44 for screwing the lower element 40 with the interposition of the lower end of the convergent-divergent ribbed member 27.

Figure 12:
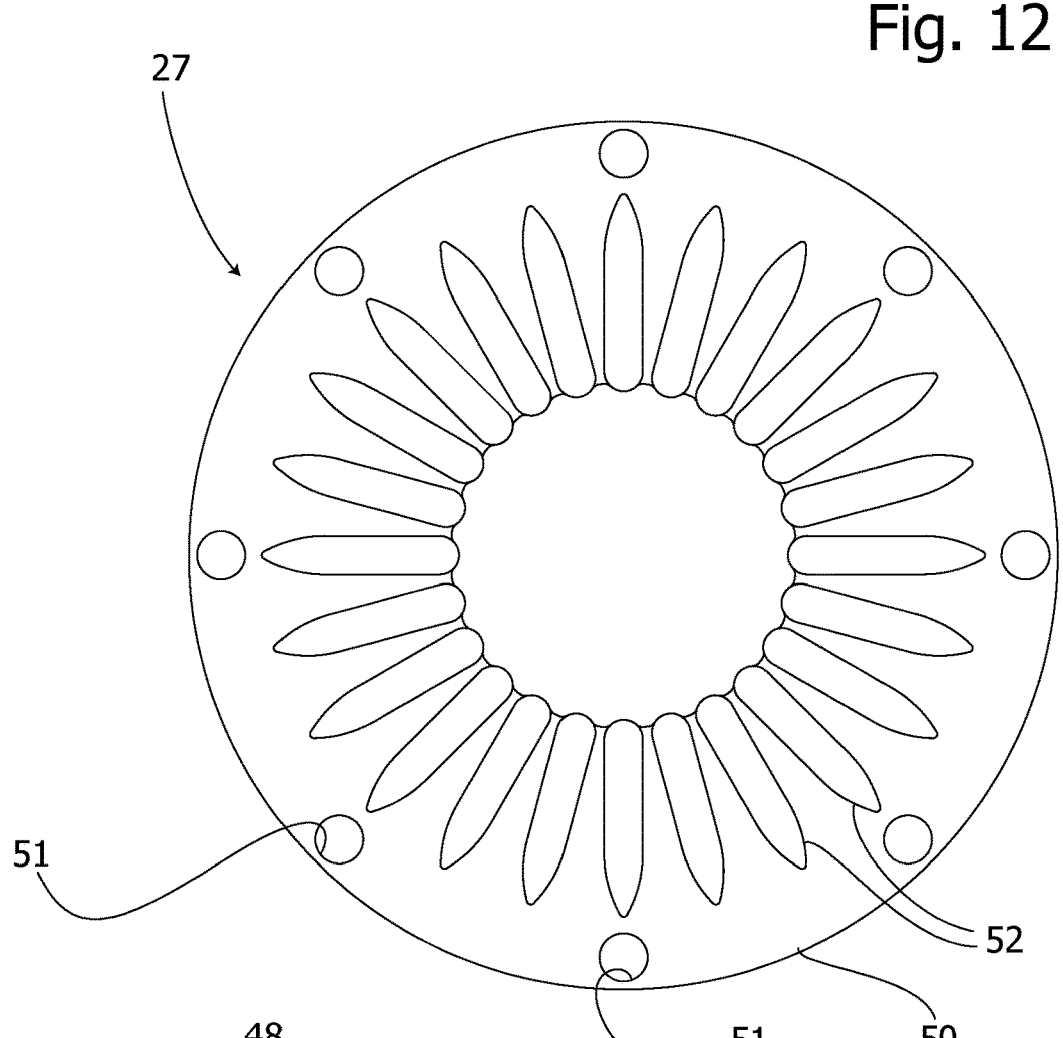
FIGS. 12 and 13 are a bottom plan view and a longitudinal cross-section, respectively, of a convergent-divergent ribbed member in the temporarily clamping device in FIG. 5.
Figure 13:
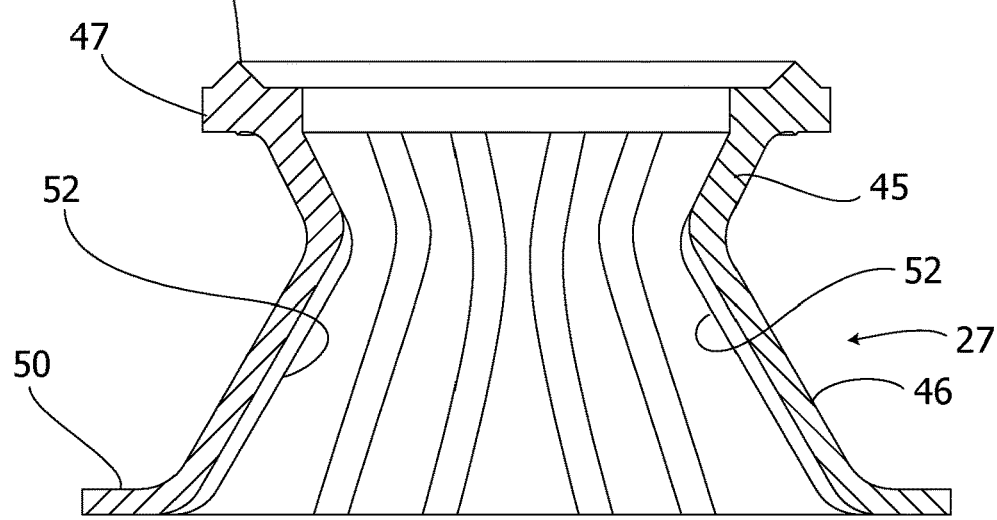

With reference to FIGS. 12 and 13, which are respectively a bottom plan view and a longitudinal section thereof, the convergent-divergent ribbed member 27 has an upper convergent portion 45 and a lower divergent portion 46. The upper convergent portion 45 has an edge 47 intended to be sandwiched between the upper element 38 and the side element 39. The edge 47 has an upper annular projection 48. The upper annular projection 48 is destined to be received in a circular recess 49 of the upper element 38. The lower divergent portion 46 of the convergent-divergent ribbed member 27 terminates with a flange portion 50 provided with holes 51 intended to be crossed by threaded couplings. The convergent-divergent ribbed member 27 is made of elastic material and has ribs indicated generally as 52 which promote the clamping of the fruit P.

Figure 15:
FIGS. 14 and 15 are a bottom plan view and a cross-section along the lines C-C, respectively, in a lower element of the temporarily clamping device of FIG. 5.
Figure 14:
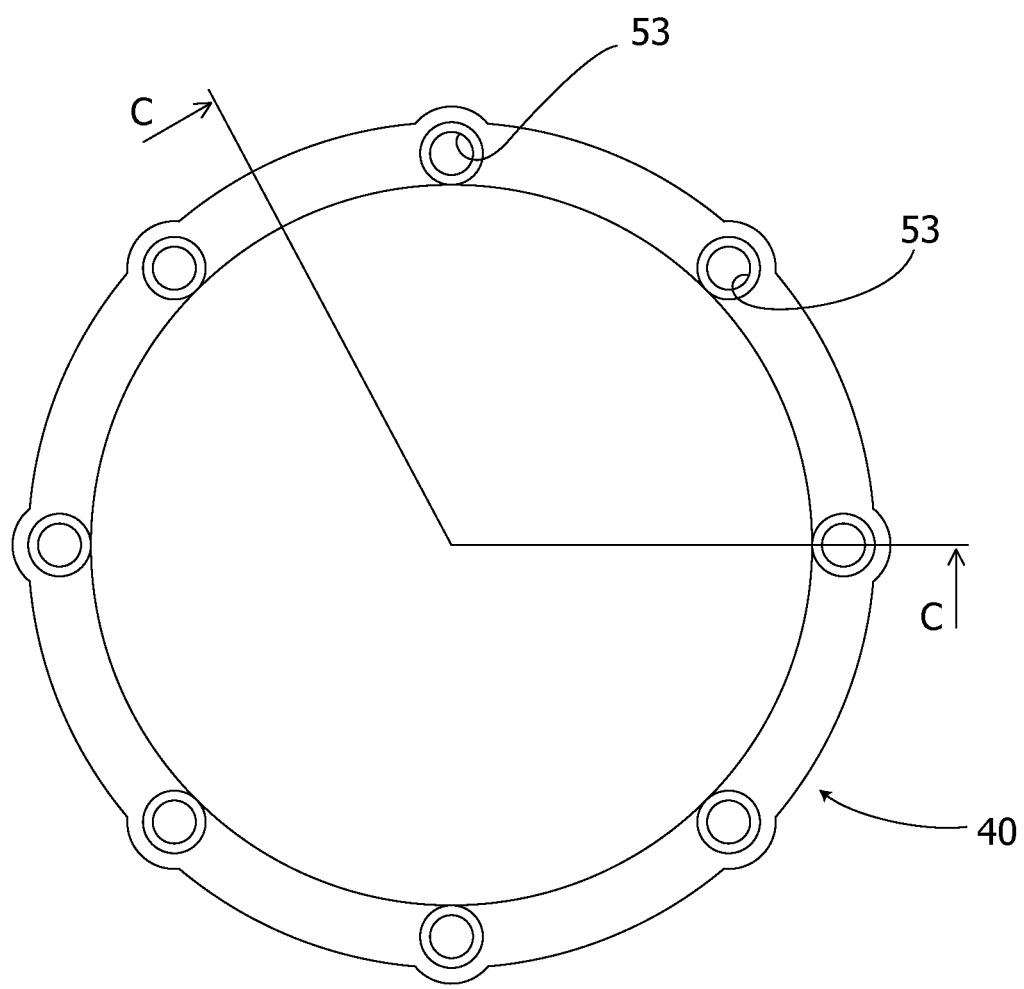

In FIGS. 14 and 15, which are a bottom plan view and a cross-section along the lines C-C in FIG. 14, respectively, there is shown the lower element 40 of the temporarily clamping device 25. It is substantially a ring provided with through holes 53 for threaded couplings that clamp the flange portion 50 with the side piece 39 through their coaxial holes 51 and 44.

Turning to FIG. 6, where a through hole for the compressed air is indicated as 54, it is clear that the compressed air causes a deformation of the convergent-divergent ribbed member 27 towards the fruit P, which is clamped in its neatly oriented position. Once the pitting occurred, the fruit P, by gravity but also possibly helped by the ejection jet described above, is maintained in position in the recess 5 of the fruit holding flight 4 to pass to the cutting section 12 as shown in FIG. 4.

The cutting section 12 has a plurality of pairs of distinct upper blades 55 for each fruit holding flight 4 and fixed to the upper transverse head 8 above the respective recesses 5. The pairs of distinct upper blades 55 equal in number to the lanes of the machine according to the present invention, perform a side cutting of the fruits, thereby dividing each fruit into two halves and freeing it of the pit which has been separated from the fresh in the pitting section. Retaining elements 15 can be provided as for the pre-cutting section 10.

Figure 16:
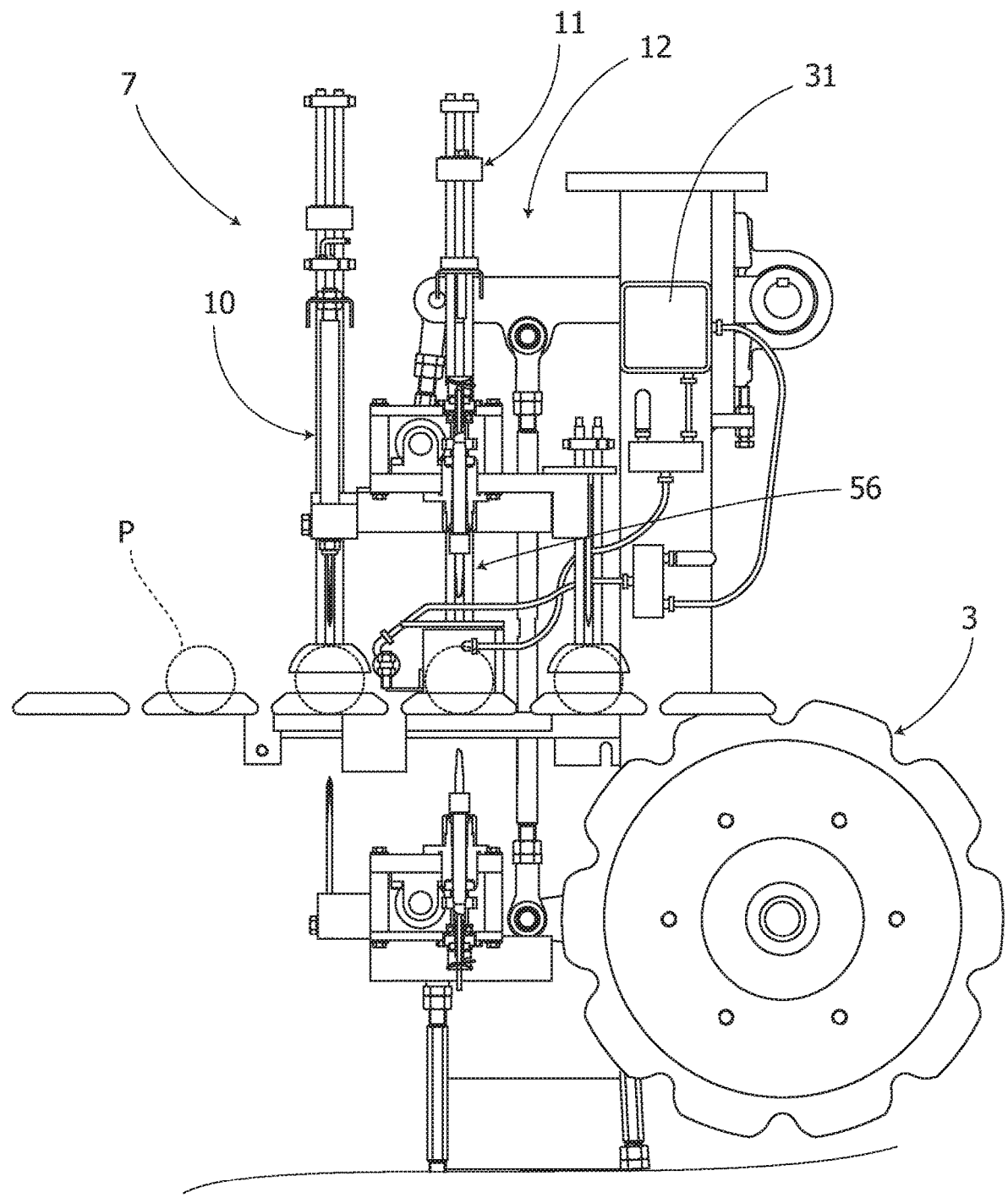
FIG. 16 is a partially cut fragmentary schematic side view of a multi-lane machine such as that in FIG. 1, but provided with a second example of a temporarily clamping device according to the present invention.
Figure 17:
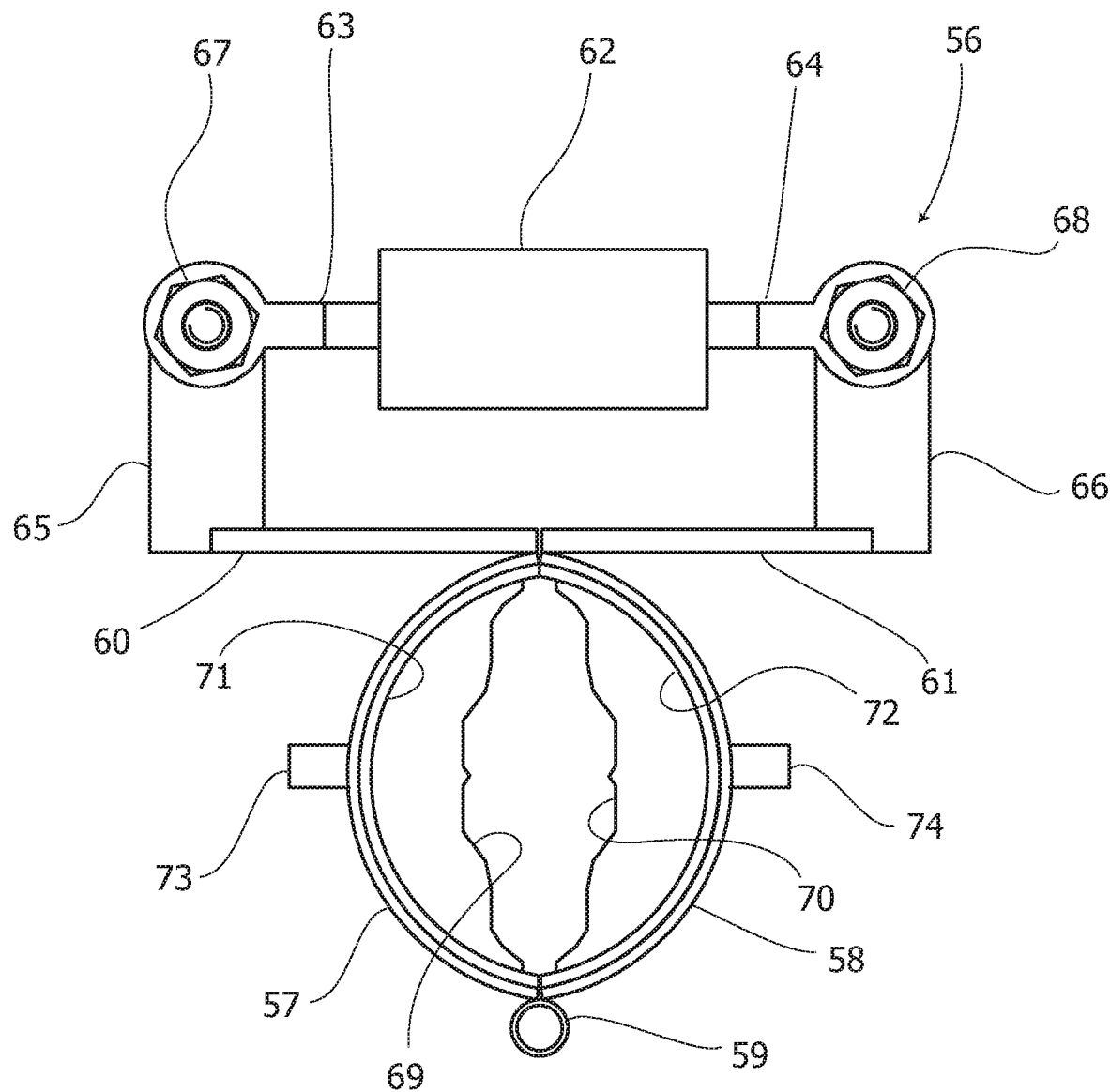
FIG. 17 is a top plan view of the second example of a temporarily clamping device in FIG. 16.

Reference is made now to FIG. 16, which is a partially cut fragmentary schematic side view of a multi-lane machine such as that in FIG. 1, but provided with a second embodiment of a temporarily clamping device according to the present invention. Reference numerals equal to those in FIG. 1 indicate like parts, which are not described again. The second embodiment of a temporarily clamping device, which is seen in a top plan view in FIG. 17 is designated as 56.

The temporarily clamping device 56 comprises two vertical semi-cylindrical members 57, 58 hinged along a generatrix thereof with a hinge schematized as 59. From the opposite side to the hinge 59, facing ends of the vertical semi-cylindrical members 57, 58 are connected to respective arms 60, 61 of an opening and closing device including a pneumatic actuator 62 connected by ball joints 63, 64 to respective brackets 65, 66 bearing the relative arms 60, 61 and adjusted by means of adjustment and clamping nuts 67, 68. The vertical semi-cylindrical members 57, 58 are actuated by means of the pneumatic actuator 62 to close around a fruit to be pitted. In order to optimize the gripping contact between the vertical semi-cylindrical members 57, 58, each vertical semi-cylindrical member 57, 58 has a shaped organ 69, 70 forming an air chamber 71, 72 connected to the compressed air reservoir 31 by means of respective fittings 73, 74. The shaped organs 69, 70 form a retaining groove that, after being filled with an inflow of compressed air, applies a pressure on the side surface of the fruit in order to hold steady the latter.

The advantages deriving from the method according to the invention are clear. The main advantage lies in the fact that a risk of fragmentation of the pit that occurs in the contemporary pitting and cutting operation is avoided; in fact, if the pit is not intact, a flesh layer that remains attached to the pit in the pitting operation keeps integral the pit, so that pit fragments are prevented to be scattered in the two halves of the cut fruit and remain dangerously in the finished product. The reliable absence of fragments in the pit is particularly important when the finished product resulting from the fruit treatment is used for feeding babies and infants.

The invention claimed is:

1. A method of pitting and cutting fruits, comprising:
feeding fruits in a plurality of lanes, the fruits being oriented with their axis in a vertical position and their stalk cavities facing upward,
a pre-cutting stage to create an incision in an upper and a lower portion of each fruit,
a pitting stage after the pre-cutting stage, to separate the pit from the fruit flesh using the incision while the pit remains inside the fruit, and the fruit is held steady being temporarily blocked from movement, and
a cutting stage after the pitting stage in which a vertical cut is made in side parts of each fruit to be divided in two halves,
temporarily clamping in position the fruit by acting on its outer surface in the pitting stage to hold the fruit in position and oriented with their axis in a vertical position and their stalk cavities facing upward while each fruit is in the pitting stage, without using retaining blades which penetrate the fruit flesh.

2. A multi-lane machine comprising:

a longitudinal frame, a conveyor having fruit holding flights travelling along the longitudinal frame and being shaped with a number of recesses dimensioned according to the fruit to be transported and crosswise spaced, each recess being inferiorly provided with an opening, an upper transverse head and a lower transverse head both movable vertically with respect to the fruit holding flights, and a pitting and cutting station, comprising a pre-cutting section having a plurality of upper blades and lower blades both being fixed mutually facing to the upper transverse head and the lower transverse head, respectively, and a plurality of hollow retaining elements in the form of a spherical segment with open bases to hold the fruits in position, each hollow retaining element being hung to a pair of vertical rods movable through the upper head and being intended to lean by gravity on respective fruit oriented in the recess of the fruit holding flight; and a pitting section having a plurality of upper rotary knives and lower rotary knives both being fixed on the upper transverse head and the lower transverse head, respectively, and a cutting station having a plurality of pairs of distinct upper blades for each fruit holding flight, the pairs of distinct upper blades being fixed on the upper transverse head above the respective recesses for the side cut of the fruits, wherein the pitting section comprises a plurality of clamping devices to temporarily clamp in position each fruit oriented in the recess of its own fruit holding flight using an elastically deformable member that is connected to a compressed air supply system, each temporarily clamping device being hung to a pair of vertical rods movable through the upper transverse head to rest on the respective fruit, the compressed air supply system including a compressed air reservoir and a solenoid valve controlled by an encoder, and a programmable logic controller.

3. The machine according to claim 2, in which the elastically deformable member of the temporarily clamping device comprises an open base convergent-divergent ribbed member, being airtight mounted inside a cylindrical body without bases, and therein retained between an upper element and a side element and between the side element and a lower element with a consequent formation of an interspace between the convergent-divergent ribbed member and the side element of the cylindrical body.

4. The machine according to claim 2, in which associated to each temporarily clamping device is an ejection orifice connected through a solenoid valve to the compressed air reservoir.

5. The machine according to claim 2, wherein the temporarily clamping device comprises two semi-cylindrical vertical members, hinged along their generatrix and driven by a pneumatic actuator so that the two semi-cylindrical vertical members close around a fruit to be pitted, each semi-cylindrical member having a shaped member which forms an air chamber connected to the compressed air reservoir so as to form a retaining sleeve.

6. The machine according to claim 2, wherein the upper rotary knives and the lower rotary knives are formed by a small rod and a crescent-shaped end element.

* * * * *